US011485590B2

(12) United States Patent
Aschpurwis

(10) Patent No.: US 11,485,590 B2
(45) Date of Patent: Nov. 1, 2022

(54) METHOD AND SYSTEM FOR LOADING A DRIVERLESS TRANSPORT VEHICLE

(71) Applicant: SIEMENS AKTIENGESELLSCHAFT, Munich (DE)

(72) Inventor: Carsten Aschpurwis, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/286,549

(22) PCT Filed: Sep. 23, 2019

(86) PCT No.: PCT/EP2019/075549
§ 371 (c)(1),
(2) Date: Apr. 19, 2021

(87) PCT Pub. No.: WO2020/078666
PCT Pub. Date: Apr. 23, 2020

(65) Prior Publication Data
US 2021/0380357 A1 Dec. 9, 2021

(30) Foreign Application Priority Data
Oct. 17, 2018 (EP) .................................... 18201084

(51) Int. Cl.
*B65G 65/00* (2006.01)
*B65G 43/10* (2006.01)
*B65G 47/94* (2006.01)

(52) U.S. Cl.
CPC ........... *B65G 65/005* (2013.01); *B65G 43/10* (2013.01); *B65G 47/945* (2013.01); *B65G 2811/095* (2013.01)

(58) Field of Classification Search
CPC .... B65G 47/945; B65G 43/10; B65G 65/005; B65G 2811/095
(Continued)

(56) References Cited

U.S. PATENT DOCUMENTS 9,452,893 B1 * 9/2016 Fujihara ................. B65G 47/46
9,828,187 B2 11/2017 Chierego et al.

FOREIGN PATENT DOCUMENTS

CN 105775539 A 7/2016
CN 105873838 A 8/2016
(Continued)

*Primary Examiner* — Gene O Crawford
*Assistant Examiner* — Lester Rushin, III
(74) *Attorney, Agent, or Firm* — Laurence A. Greenberg; Werner H. Stemer; Ralph E. Locher

(57) ABSTRACT

Driverless transport vehicles or DTVs, which are automatically guided vehicles, are gaining importance in the sorting of cargo. A method for loading a driverless transport vehicle with a cargo item in a transfer point, includes loading the DTV with the cargo item by using a known delivery system during the journey of the DTV. In order to prevent cargo items from falling during loading, a higher-level control sets the delivery speed of the cargo item and the speed of travel before the cargo item is transferred to the transport vehicle, such that the delivery speed component of the transport direction is equal to the speed of travel of the transport vehicle. In this way, the continued use of existing delivery systems such as are known under the term HSI (high speed induction) is possible. A system for loading a driverless transport vehicle is also provided.

7 Claims, 2 Drawing Sheets

(58) Field of Classification Search
USPC .................................................... 198/464.3
See application file for complete search history.

(56) References Cited

FOREIGN PATENT DOCUMENTS

| | | | | | |
|---|---|---|---|---|---|
| CN | 107697533 | A | * | 2/2018 | ............... B07C 3/08 |
| CN | 107697533 | A | | 2/2018 | |
| CN | 108349667 | A | | 7/2018 | |
| CN | 110271827 | A | * | 9/2019 | |
| CN | 113086598 | A | * | 7/2021 | ............. B07C 3/082 |
| EP | 3757045 | A1 | * | 12/2020 | |
| WO | 0160674 | A1 | | 8/2001 | |
| WO | 2015002540 | A1 | | 1/2015 | |
| WO | WO-2015002540 | A1 | * | 1/2015 | ............. B62D 11/20 |

\* cited by examiner

METHOD AND SYSTEM FOR LOADING A DRIVERLESS TRANSPORT VEHICLE

BACKGROUND OF THE INVENTION

Field of the Invention

The present invention relates to a method for loading a driverless transport vehicle with a cargo item at a transfer point, wherein the cargo item approaches the direction of transport of the transport vehicle, which is moving at a speed of travel, at a delivery speed on a delivery system at a predefined acute angle. The invention also relates to a system for loading a driverless transport vehicle with a cargo item.

The invention relates to the field of sorting systems. Sorting systems identify disparately shaped and isolated cargo items arriving in any order, for example packages (in post offices), items of luggage (in airport terminals) or goods on consignment (in mail order companies) on the basis of predefined differentiation criteria, and distribute them to fixed destinations. Sorting systems such as these consist of sorting facilities which ensure the system functionality of the sorting systems with corresponding organizational sequences and suitable operating strategies implemented in associated controllers in the sorting facilities or sorting systems.

In this case the sorting facility represents the technical part of the sorting system and consists of one or more sorters implementing the distribution of the cargo item to the destinations, as well as upstream and downstream functional areas such as induction and discharge of the cargo item.

A sorter such as this consists of a merging conveyor, a distribution conveyor and end/destination points for the cargo item to be distributed. Depending on the weight of the cargo items, sorters achieve sorting speeds for cargo items of up to over 15,000 items per hour. Standard maximum weights of cargo items are approximately 20 kg to 60 kg, and in individual sorting systems even up to 150 kg.

In a technology-oriented classification of distribution conveyors based on the criteria of occupancy type, operating principle of ejection of the cargo item, and conveyance principle, a distinction is in particular made between distribution conveyors using cross-belt or crossover technology or tilt tray technology. These are referred to for short as cross-belt conveyors/crossover sorters or tilt tray sorters.

A cross-belt conveyor or crossover sorter is known from source [4].

Patent specification [5] discloses a conveyance/sorting system which contains a device for the induction of a product to a sorter, wherein the sorter contains continuous conveyance elements, such that several sorting destinations for the acceptance of products unloaded from the continuous conveyance element can be controlled. This disclosure is applicable both to linear sorters, for example sorters with prescribed displacement, and to carousel sorters, for example tilt tray sorters and crossover sorters.

Instead of transport elements or conveyance elements connected in a self-contained chain, use is increasingly being made of driverless autonomous transport vehicles known in German as FTF (Fahrerlose Transportfahrzeuge) and in English as automated guided vehicles, AGVs or "mobile robots":

FTF
Fahrerlose Transportfahrzeuge [driverless transport vehicles],→Source [2];

AGV
Automated Guided Vehicle,→Source [1];
Mobile robots→Source [3].

The aforementioned vehicles are referred to summarily below by the term "automated guided vehicles AGV" or "AGV" for short.

In the aforementioned area of use these automated guided vehicles achieve speeds of up to about 3 m/s. Under particular conditions even higher speeds can be envisaged for these AGVs. Route guidance takes place on the basis of optimum utilization of space, mainly horizontally.

In contrast to linear or carousel conveyors, these automated guided vehicles make it possible to approach a plurality of sorting destinations directly in a far larger area of action. Intermediate sorting is thereby avoided.

It is however desirable also to apply the known high-rate induction systems to the loading of automated guided vehicles. In technical language these high-rate inductions/high-rate induction systems are known by the terms "high speed induction HSI" or "high rate induction" (see document [5']).

The usual procedure for loading an automated guided vehicle AGV, entailing the steps
 stopping the AGV at a transfer point;
 loading the cargo item onto the AGV, where appropriate using the AGV's gripper arms;
 starting up the AGV and travel to a destination point;
results in a considerable restriction in the throughput of cargo items to be transported and is in addition energy-intensive, since braking to zero and restarting considerably restricts the autonomy of the AGV. In this connection, autonomy means the operating life of an AGV between two battery charging cycles.

SUMMARY OF THE INVENTION

The object of the present invention is therefore to specify a method for loading automated guided vehicles with a cargo item, in which:
 existing induction systems can be retained wherever possible;
 no restriction is placed on the throughput of existing induction systems;
 the autonomy of the automated guided vehicles used is wherever possible unaffected.

A system for performing the aforementioned method is also to be specified.

This object is achieved by the measures specified in the independent claims. Advantageous embodiments of the invention are specified in further claims.

The inventive method for loading an automated guided vehicle with a cargo item in a transfer point is based on the fact that the cargo item approaches the direction of transport of the transport vehicle, which is moving at a speed of travel, at a delivery speed on a delivery system at a predefined acute angle.

The inventive method is characterized by the following method steps:
 i) a higher-level controller sets the delivery speed ($V_i$) of the cargo item (20) and the speed of travel ($V_d$) before the cargo item is transferred to the transport vehicle (10), such that the delivery speed component ($V_{id}$) of the direction of transport (d) in the region of the transfer point (48) is equal to the speed of travel ($V_d$) of the transport vehicle (10) and
 ii) the cargo item (20) is transferred in the transfer point (48) from the delivery system (30) to the transport vehicle (10).

The advantages explained below can also emerge from said inventive method.

a) The method is independent of the carrier on the automated guided vehicle. The following can alternatively be provided as the carrier:
Surface,
Tilt tray,
Crossover.

b) According to the inventive method a non-zero speed component stays orthogonal to the direction of travel. Since the angle between the direction of transport of the transport vehicle and the direction of induction in the region of the transfer point is an acute angle, this speed component is only approximately half of the speed of travel because $$\sin 30° = 0.5,$$

if, for example, the value of a maximum of 30° is selected as the acute angle.

c) The higher-level controller ensures that the throughput of the cargo items to be delivered remains approximately the same in regular operation as when using a known circulation or linear conveyor, since the automated vehicles can be correspondingly dimensioned in respect of their speed of travel.

d) The comparison with the prior art for linear conveyors or for carousel conveyors/circular conveyors immediately shows that the space required for the delivery of cargo items is significantly less overall. Since an AGV can actually approach any destinations in a plant, another advantage is that a cargo item is subject to a sorting procedure/loading procedure just once. Repetitions/feedbacks for the sorting process are not necessary. A feedback is part of a normal process step in particular with linear conveyors/linear sorters.

e) Complex and expensive gripper systems are not needed for loading an AGV. As a result, the time taken for loading onto an AGV can be considerably reduced, so that a two-fold saving can be achieved.

As mentioned, above, according to the inventive method a non-zero speed component stays orthogonal to the direction of travel. To prevent the cargo item loaded onto the AGV from sliding off, the loading surface can be configured such that it has a good sliding friction between the cargo item and the loading surface.

A particular embodiment of the present invention represents an automated guided vehicle which is fitted with a tilt tray. The particular advantage of the tilt tray is that the cargo items are thereby accepted by the AGV even if they are not guided very precisely or not discharged very precisely within the transfer point. At very high speeds an inclination of the tilt tray with an angle of inclination of a few degrees can also be provided for the tilt tray, such that thanks to the inclination of the tilt tray preventive action can be taken to stop the cargo item from overshooting.

In further embodiments of the present invention provision can also be made to counterbalance the speed component orthogonally to the direction of travel of the AGV:

i) Immediately after the transfer the AGV turns in a curve virtually instantaneously, such that the further direction of travel approximately corresponds to the direction of induction.

ii) The automated guided vehicle is provided with a cross-belt conveyor, in other words a conveyor orthogonal to the direction of travel in the region of the transfer point. To counterbalance the speed component orthogonally to the direction of travel of the AGV it can now additionally be provided that the higher-level controller sets the delivery speed of the cargo item before the cargo item is transferred to the transport vehicle, such that the delivery speed component in the direction of transport of the cross-belt conveyor in the region of the transfer point is equal to the speed of the cross-belt conveyor. In this way the cargo item is prevented from slipping down or sliding off the AGV in the region of the transfer point.

The invention is explained in greater detail by way of example below using the drawing.

DETAILED DESCRIPTION OF THE INVENTION

Figure 1:
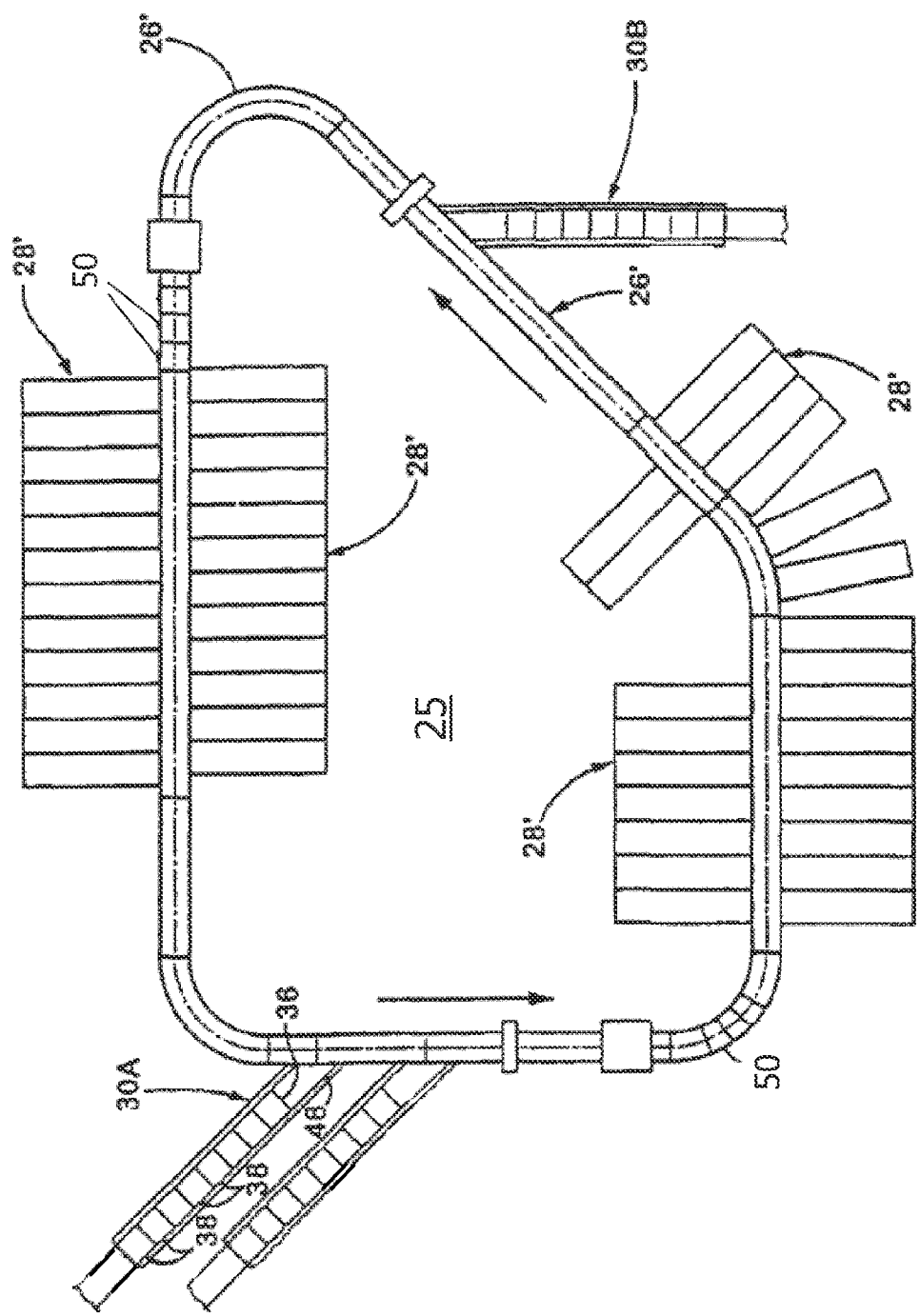
FIG. 1 illustrates a feed system with induction units and a recirculation track according to the prior art.
Figure 2:
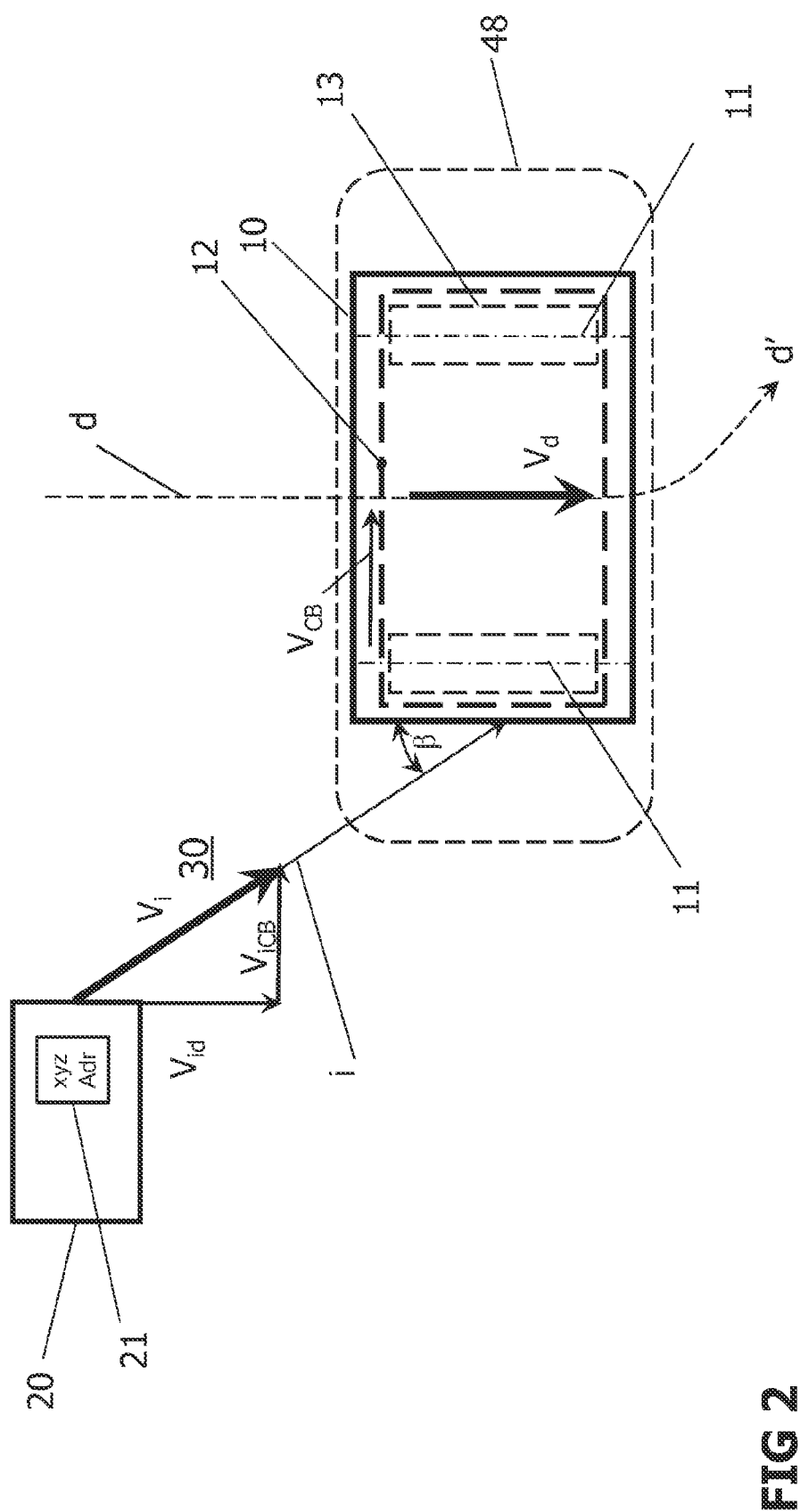
FIG. 2 illustrates the transfer of a cargo item from the induction system to an automated guided vehicle.

FIG. 1 shows a feed system with induction units and a recirculation track, in accordance respectively with FIG. 2 in each of patent specifications [5] and [5']; patent specification [5] is a translation of patent specification [5']. Individual reference characters have been removed. Components in FIG. 2 in each of patent specifications [5] and [5'] which are also present in an embodiment of the present invention are therefore respectively provided with the same reference characters. FIG. 1 shows a carousel conveyor 25 (also called a circular conveyor), in which a dual induction unit 30A and a single induction unit 30B are provided, in order for the carousel conveyor 25 containing a plurality of carriers 50 to be loaded with cargo items 20 (not shown in FIG. 1) to be sorted. The reference character 48 designates a transfer from an induction unit 30 onto the carriers 50. Such induction units 30 also form the basis for the embodiments of the present invention.

FIG. 2 shows a plan view of a transfer point 48 for the transfer of a cargo item 20 onto an automated guided vehicle AGV 10. FIG. 2 in this embodiment of the invention is based on an AGV 10 which has a cross-belt conveyor 12 driven via support rollers/drive rollers 13. The support rollers/drive rollers each have an axle 11. The illustration in FIG. 2 is a snapshot prior to the transfer of the cargo item 20 onto the AGV 10. Strictly speaking, the cargo item 20 should be shown very near the AGV 10. For reasons of clarity, it is not shown like this, but further up in FIG. 2.

In another embodiment of the present invention the AGV 10 can also be provided with a tilt tray, that is to say analogously to the aforementioned tilt tray sorters.

Purely by way of example, an identification/address 21 attached to a cargo item 20 is shown in FIG. 2. As in the prior art, the cargo items 20 are delivered on a delivery system to the transfer point 48 in the direction of delivery i at a speed $V_i$. The AGV 10 approaches the transfer point 48 in the direction of transport d at a speed $V_d$. The direction of transport d and the direction of delivery i are arranged at an acute angle β. It is assumed here that the side wall shown of the AGV 10 is parallel to the direction of transport d.

The transfer point 48 is based on a control/regulation unit for the higher-level controller of the delivery system 30 and on a plurality of automated guided vehicles 10. This controller/regulation unit is not illustrated in FIG. 2 and furthermore comprises a plurality of sensors and actuators for the delivery unit, which is likewise not shown. Also not illustrated is the controller located on every AGV, which controls the route of the AGV, including the sensor system, to prevent collision. The term "transfer point" 48 here designates a functional location and not a device of the delivery system 30 or a device on the AGV 10.

The aforementioned delivery speed $V_i$, in accordance with the arrangement in FIG. 2 with the direction of travel d of the AGV, has the speed components $V_{id}$ in the direction of travel d, and $V_{iCB}$ orthogonally to the direction of travel d.

For the transfer/discharge of a cargo item 20, the higher-level controller causes the speed component $V_{id}$ in the direction of travel d and the speed of travel $V_d$ of the automated guided vehicle AGV to be equal at the time of the transfer. As a result, a reliable and secure placement of the cargo item 20 on the AGV 10 is enabled.

There remains a non-zero speed component $V_{iCB}$ orthogonal to the direction of travel d. For the embodiment shown of the invention in accordance with FIG. 2 a counterbalancing of said speed component $V_{iCB}$ takes place, in that the higher-level controller causes, by means of a corresponding sensor system at the transfer point 48, the cross-belt conveyor 12 to be driven such that its speed $V_{CB}$ at the time of the transfer or discharge is equal to the speed component $V_{iCB}$. Immediately after the cargo item is placed, this speed $V_{CB}$ is reduced to zero.

The angle β between the direction of travel d of the AGV and the direction of delivery i is preferably less than 45°. The speed components $V_{id}$, $V_{iCB}$ in the direction of transport or in the direction of the moving cross-belt conveyor are given as follows:

$$V_{id} = \sin \beta \cdot V_d \quad V_{iCB} = \cos \beta \cdot V_d$$

Typical values for the angle β satisfy the relationship:

$$\beta \leq 30°.$$

From these relationships, not only can the executability of braking by means of the cross-belt conveyor 12 be derived, but also the fact that acceleration values high enough to cause the cargo item 20 to fall off the cross-belt conveyor 12 during braking do not occur.

LIST OF REFERENCE CHARACTERS, GLOSSARY

10 Automated guided vehicle AGV
11 Axle of the roller for cross-belt conveyor
12 Cross-belt conveyor
13 Support roller/drive roller for cross-belt conveyor
20 Cargo item
21 Identification of a cargo item, e.g. address
25 Carousel conveyor, circular conveyor
26 Continuous element
28, 28'
  Destination points; sorting destinations
30, 30A, 30B
  Induction system, induction unit
50 Carrier
i Direction of induction
36 Unloading end
38 Conveyor unit of the induction system 30
48 Transfer point
50 Carrier of a continuous element 26
β Angle between direction of transport d of the transport vehicle and direction of induction i
CB Direction of conveyance of the cross-belt conveyor on the AGV
d Transport route, route of the automated guided vehicle AGV, direction of transport
AGV Automated Guided Vehicle
HSI High Speed Induction
AGVS Automated Guided Vehicle System
$V_{CB}$ Speed of the cross-belt conveyor 12
$V_d$ Speed of the automated guided vehicle AGV; speed of travel
$V_i$ Speed of a cargo item on the induction system; delivery speed
$V_{id}$, $V_{iCB}$
  Speed components of $V_i$ in the direction of transport or in the direction of the moving cross-belt conveyor

LIST OF CITED DOCUMENTS AND REFERENCES

[1] AGV https://en.wikipedia.org/wiki/Automated guided vehicle
[2] FTF https://de.wikipedia.org/wiki/Fahrerloses Transportfahrzeug
[3] mobile robots https://en.wikipedia.org/wiki/Mobile robot
[4] Quergurtsorter [cross-belt sorters] https://de.wikipedia.org/wiki/Quergurtsorter
[5] DE 600 12 206 T2 SPEISUNGSSYSTEM MIT HOHER LEISTUNG Siemens Aktiengesellschaft German translation of patent specification [5']
[5'] EP 1 224 038 81 HIGH RATE INDUCTION SYSTEM Siemens Aktiengesellschaft

The invention claimed is:

1. A method for loading a driverless transport vehicle with a cargo item in a transfer point, the method comprising:
  moving the transport vehicle in a direction of transport at a speed of travel;
  moving the cargo item in a delivery system at a delivery speed to approach the direction of transport of the transport vehicle at a predefined acute angle;
  i) using a higher-level controller to set the delivery speed of the cargo item and the speed of travel of the transport vehicle before transferring the cargo item to the transport vehicle, causing a delivery speed component of the direction of transport in a region of the transfer point to be equal to the speed of travel of the transport vehicle;
  using the higher-level controller to cause the driverless transport vehicle to travel over a curve immediately after execution of method step i); and
  ii) transferring the cargo item in the transfer point from the delivery system to the transport vehicle.

2. The method according to claim 1, which further comprises transferring the cargo item into a tilt tray of an automated guided vehicle.

3. The method according to claim 2, which further comprises stopping the cargo item from sliding out by inclining the tilt tray prior to carrying out step ii).

4. The method according to claim 1, which further comprises aligning the curve to cause the driverless transport vehicle to travel in a direction of travel corresponding to a direction of induction.

5. The method according to claim 1, which further comprises providing the driverless transport vehicle with a cross-belt conveyor having a direction of conveyance orthogonal to the direction of transport of the transport vehicle, and transferring the cargo item onto the cross-belt conveyor.

6. The method according to claim 5, which further comprises carrying out step i) by using the higher-level controller to set the delivery speed of the cargo item and the speed of travel of the transport vehicle before the cargo item is transferred to the transport vehicle, and setting a delivery speed component of the cargo item in a direction of the cross-belt conveyor in the region of the transfer point to be equal to the speed of the cross-belt conveyor.

7. A system for loading a driverless transport vehicle, the system comprising:
   at least one delivery system delivering cargo items to a plurality of driverless transport vehicles; and
   a device for performing the method according to claim 1.

* * * * *